(12) United States Patent
Pepper et al.

(10) Patent No.: US 8,457,128 B2
(45) Date of Patent: *Jun. 4, 2013

(54) CAPTURING PACKETS WITH PARALLEL CAPTURE ENGINES

(75) Inventors: Gerald Pepper, Thousand Oaks, CA (US); Manley Klassen, Oxnard, CA (US); Dwayne Hunnicutt, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 13/101,987

(22) Filed: May 5, 2011

(65) Prior Publication Data

US 2011/0211593 A1 Sep. 1, 2011

Related U.S. Application Data

(63) Continuation-in-part of application No. 12/420,771, filed on Apr. 8, 2009, now Pat. No. 7,953,092.

(51) Int. Cl.
*H04L 12/28* (2006.01)
(52) U.S. Cl.
USPC .......................... 370/392; 709/223; 709/224
(58) Field of Classification Search
USPC .................................................. 370/392, 474
See application file for complete search history.

(56) References Cited

U.S. PATENT DOCUMENTS

| 5,884,025 | A | 3/1999 | Baehr et al. |
| 6,233,256 | B1 | 5/2001 | Dieterich et al. |
| 6,453,345 | B2 | 9/2002 | Trcka et al. |
| 7,633,944 | B1 | 12/2009 | Chang et al. |
| 7,953,092 | B2 * | 5/2011 | Pepper et al. .................. 370/392 |
| 2003/0208616 | A1 | 11/2003 | Liang et al. |

OTHER PUBLICATIONS

IXIA, Specifications for Load Modules—Multilayer Gigibit Ethernet for LM1000LX, LM1000SX, LM1000GBIC, LM1000T, Product Specification Sheet, pp. 1-2.
IXIA, The Ixia 200 Traffic Generator and Analyzer, Product Description 1997-1999, file://C:\DS\IXIA\Patents\081403\ix200.htm, accessed Aug. 15, 2003.

* cited by examiner

*Primary Examiner* — Albert T Chou
(74) *Attorney, Agent, or Firm* — SoCal IP Law Group LLP; John E. Gunther; Steven C. Sereboff

(57) ABSTRACT

There is disclosed a method of capturing packets and packet receivers to capture packets. A plurality of packets may be received form a network. A timestamp may be attached to each received packet. The timestamped received packet may be distributed among a plurality of capture engines. Each of the plurality of capture engines may store, in a respective capture memory of a plurality of capture memories, at least some timestamped received packets determined to match one or more of a plurality of predetermined capture criteria. A list in timestamp order of contiguous packets stored in the plurality of capture memories may be prepared.

28 Claims, 10 Drawing Sheets

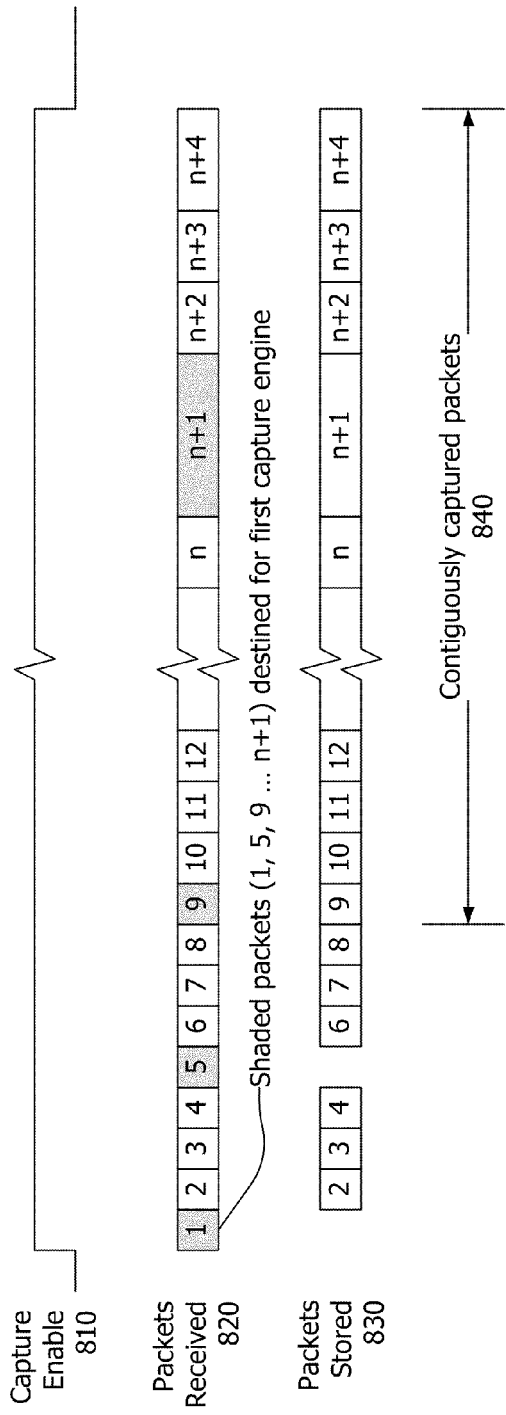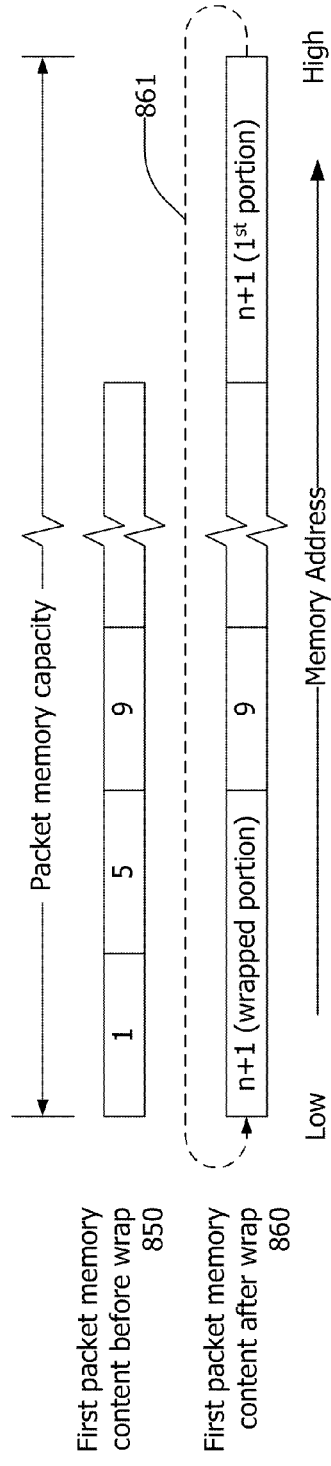
FIG. 8A
FIG. 8B

CAPTURING PACKETS WITH PARALLEL CAPTURE ENGINES

RELATED APPLICATION INFORMATION

This patent is a continuation-in-part of the following prior-filed non-provisional patent application Ser. No. 12/420,771, filed Apr. 8, 2009, entitled "Traffic Receiver Using Parallel Capture Engines".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to receiving and capturing traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. In order to test a packet switched network or a device included in a communications network, it is often desirable to generate network traffic having a data rate equal to the line rate or maximum possible data rate of the network communication path or device.

For the purpose of reporting network traffic data, the packets may be organized into flows, where a "flow" is any plurality of data units for which network traffic statistics are accumulated and reported. The data units in a given flow may be distinguished by a flow identifier contained in each data unit. The flow identifier may be, for example, an address, a port number, a tag, or some other field or combination of fields within each data unit.

A source may support multiple outgoing and incoming flows simultaneously and concurrently, for example to accommodate multiple packet types or rates. A source may be, for example, a port on a network interface. "Simultaneously" means "at exactly the same time." "Concurrently" means "within the same time." A plurality of concurrent flows may be combined to form what will be referred to herein as a "stream". A single stream may represent a plurality of packet types. The flows within a stream may be combined through interleaving. The interleaving may be balanced, unbalanced, and distributed among the represented flows. The data rate of a stream may be less than or equal to the line rate of a network communication path over which the stream is transmitted. Although the packets within a flow may be transmitted at the line rate, the average data rate of a flow over time may be much lower, since a plurality of interleaved flows may share the data rate of the stream.

To thoroughly test a packet switched network or an item of network equipment, a line-rate, or near line-rate, test stream may be generated and transmitted through the network or equipment under test. Each test stream may be composed of a plurality of interleaved flows representing multiple packet types including simulated data, audio, and video flows. After the test stream is transmitted through the network or equipment under test, a traffic receiver may be used to receive the test stream. A traffic receiver may also be used to receive regular, non-test, network traffic for network performance monitoring and fault isolation. The traffic receiver may accumulate traffic statistics, for example for each flow, indicative of the performance of the network or equipment under test. The traffic receiver may also capture and save specific packets for further analysis.

DESCRIPTION OF THE DRAWINGS

FIG. 8A is a timing diagram illustrating the operation of a capture engine.

FIG. 8B is a graphical representation of packets being stored in a packet memory.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 16, 32, 64, 128, 256, or more parallel connections.

DETAILED DESCRIPTION

Description of Apparatus

Figure 1:
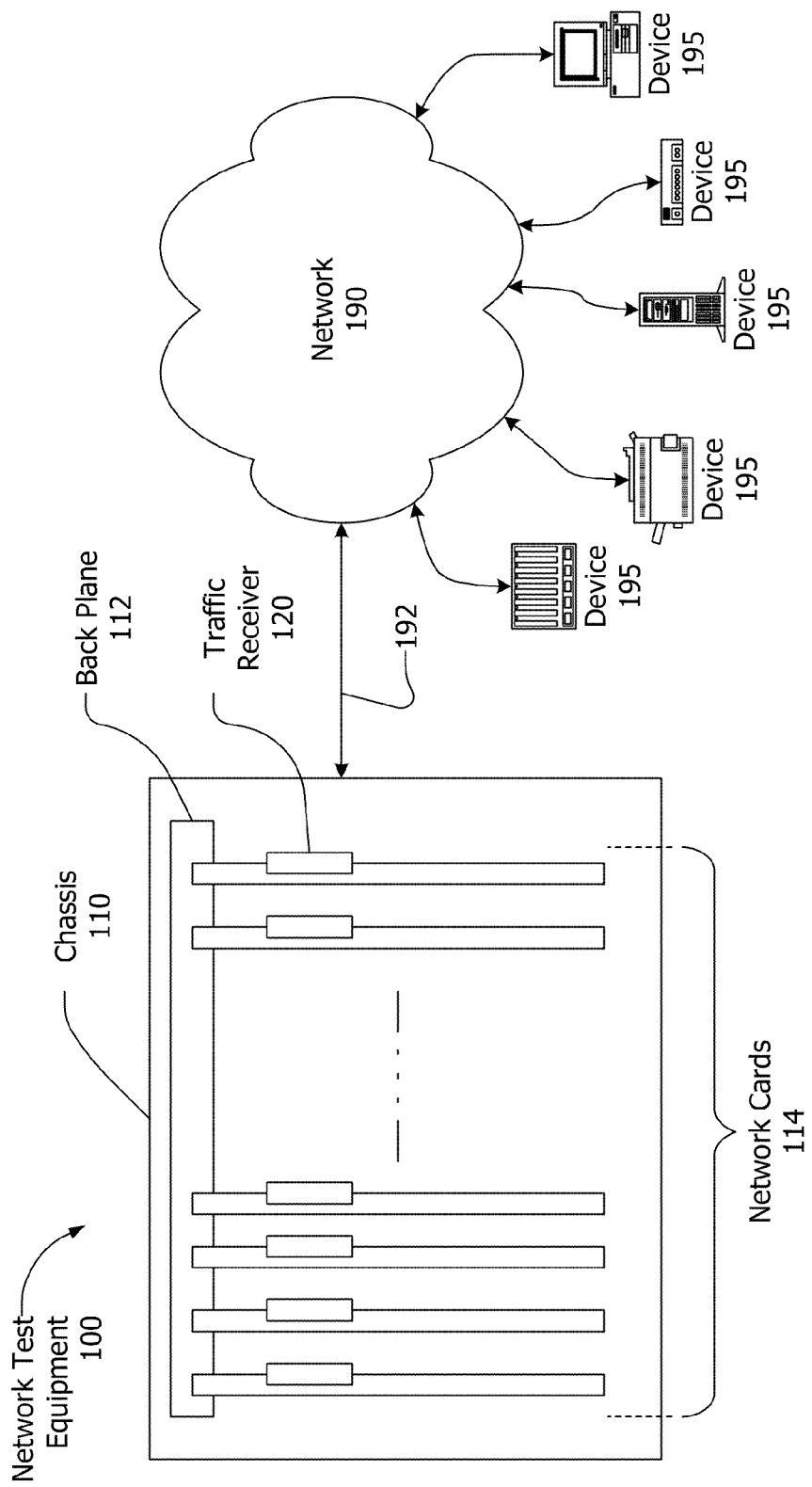
FIG. 1 is a block diagram of a network environment.

Referring now to FIG. 1, there is shown a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a back plane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may provide one or more network ports. The ports of the network cards 114 may be connected to the network 190 through a communication medium 192, which may be a wire, an optical fiber, a wireless link, or other communication medium. Each network card 114 may support a single communications protocol, may support a number of related protocols, or may support a number of unrelated protocols. The network cards 114 may be permanently installed in the network test equipment 100 or may be removable.

Each network card 114 may include one or more traffic receivers 120 coupled to a port. The traffic receiver 120 may receive and evaluate a stream of packets received from the network via the port. The traffic receiver may also capture and store at least some of the received packets. Each network card 114 may also include one or more traffic generators (not shown in FIG. 2).

The back plane 112 may serve as a bus or communications medium for the network cards 114. The back plane 112 may also provide power to the network cards 114.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers.

The network 190 may be a Local Area Network (LAN), a Wide Area Network (WAN), a Storage Area Network (SAN), wired, wireless, or a combination of these, and may include or be the Internet. The network test equipment 100 and the network devices 195 may communicate simultaneously with one another, and there may be plural logical communications between the network test equipment 100 and a given network device 195. The network itself may be comprised of numerous nodes providing numerous physical and logical paths for data to travel.

Figure 2:
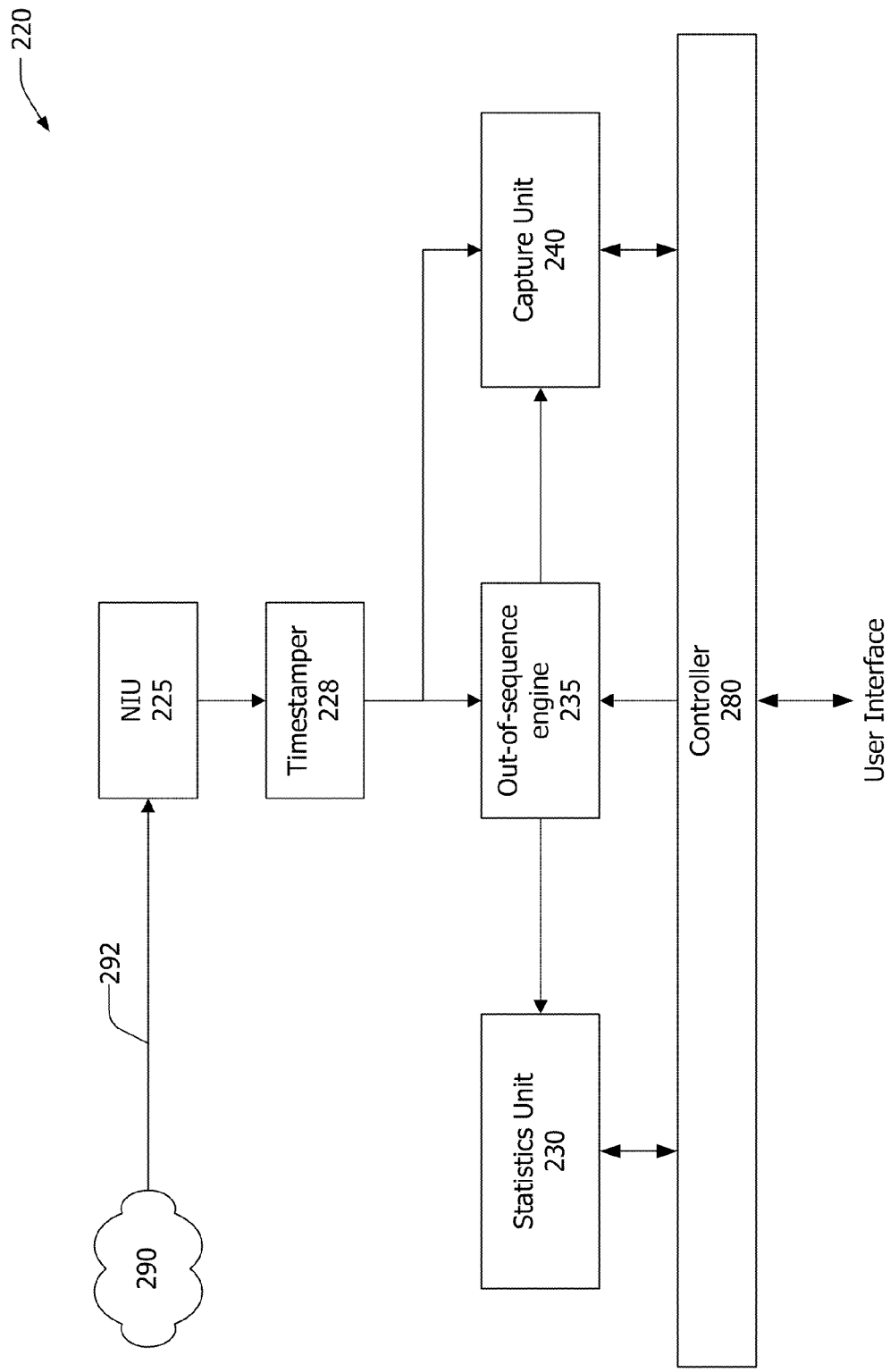
FIG. 2 is a block diagram of a traffic receiver.

Referring now to FIG. 2, an exemplary traffic receiver 220 may include a network interface unit (NIU) 225, a timestamper 228, an out-of-sequence engine 235, a statistics unit 230, a capture unit 240, and a controller 280 which may be coupled to a user interface (not shown) that may be external to the traffic receiver. The timestamper 228, the out-of-sequence engine 235, the statistics unit 230, the capture unit 240, the network interface unit (NIU) 225, and the controller 280 are logical partitions of the functions of the traffic receiver 220, but may implemented, at least in part, using common hardware.

Within this description, the term "engine" means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be converted into process instructions and masks for fabricating the engine within an application specific integrated circuit (ASIC). The gate netlist or other physical description may be further converted into programming code for implementing the engine in a programmable device such as a field programmable gate array (FPGA), a programmable logic device (PLD), or a programmable logic arrays (PLA), all of which will be referred to herein as "programmable circuit devices".

Programming code for implementing all or a portion of the apparatus described herein in a programmable circuit device may be stored on a machine readable storage media. These machine readable storage media include, for example, magnetic media such as hard disks, floppy disks and tape; optical media such as compact disks (CD-ROM and CD-RW) and digital versatile disks (DVD and DVD±RW); flash memory cards; and other device and objects for storing information. The term "machine readable storage media" does not encompass transient media such as waveforms, propagating media, and communications media.

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common PROGRAMMABLE CIRCUIT DEVICE, ASIC, or other circuit device.

The network interface unit 225 may receive traffic from network 290 in the form of a stream comprised of a plurality of flows, with each flow comprised of packets that may be interleaved with packets from other flows. Each received packet may include a flow identifier indicating the respective flow. The flow identifier may be all or part of one or more fields within the packet such as, for example, source address, destination address, port numbers, and/or other fields.

The network interface unit 225 may receive packets from the network 290 via a link 292 which may be an optical, electrical or wireless link. The packets may be received as one line-rate serial data signal, or as a small plurality of serial data signals which, in combination, provide data at the line rate. The network interface unit 225 may convert the line-rate serial data signal or signals into a more parallel data path having a lower data rate. The parallel data path may be some number of bits in width, which is to say that the data path may be comprised of that number of signals in parallel. The clock rate of the parallel data path may be equal to or greater than the line rate of the link 292 divided by the path width in bits.

For example, the link 292 may be an OC-192 link, a Sonet link, or an Ethernet link having a data rate of about 10 Gigabits per second (Gbs). The network interface unit may convert the received serial data signal into a 32-bit parallel data path having a clock rate of about 312 Mbs, a 64-bit parallel data path having a clock rate of about 156 Mbs, or a 128-bit parallel data path having a clock rate about 78 Mbs. For further example, the link 292 may be an OC-768 optical link having a data rate of about 40 Gbs. The network interface unit may convert the received serial data signal into a 256-bit parallel data path having a clock rate of about 150 Mbs. The link 292 may operate at other data rates.

Packets received by the network interface unit 225 may be directed to the timestamper 228. The timestamper 228 may be an engine, as previously defined, that attaches a timestamp to each received packet. The timestamper 228 may include or be coupled to a clock. The timestamper 228 may include circuitry to sample the clock each time a packet arrives to provide the timestamp. The timestamp may be data indicating a real or relative arrival time of the packet. The timestamp may be attached to the head of the packet or the end of the packet. The timestamp may be embedded within the packet or may be communicated by independent signal lines. The timestamp data may be communicated to one or more of the statistics unit 230, the out-of-sequence engine 235, and the capture unit 240 before, after, during or in parallel with the received packet. A packet with an attached timestamp will be referred to as a "timestamped packet".

Timestamped packets may be routed to the out-of-sequence engine 235. The out-of-sequence engine 235 may then determine if each packet is in the appropriate sequence within its respective flow. For example, the out-of sequence engine 235 may include circuits to extract a flow identifier each of the received packets. The out-of sequence engine 235 may determine, from the flow identifier, if the packet contains a sequence number and, if so, extract the sequence number. The out-of-sequence engine 235 may maintain a table of the next expected sequence number for each flow. The out-of sequence engine 235 may determine if the packet was received in the correct sequence by comparing the sequence number extracted from the packet with the expected sequence number from the table. The out-of sequence engine 235 may update the expected sequence number for the appropriate flow in the table each time a packet is received. The out-of sequence engine 235 may attach a tag to the received packet or assert a signal or otherwise indicate when a packet is received out of the expected sequence. The tag may be a data bit or signal that is communicated to one or both of the statistics unit 230 and the capture unit 240 before, after, or in parallel with the timestamped packet.

Each packet, along with the attached timestamp and the tag indicating if the packet was received out of sequence, may be communicated from the out-of-sequence engine 235 to the statistics unit 230. The statistics unit 230 may extract relevant information from each packet and accumulate statistics for each flow. Apparatus and methods for accumulating flow statistics are described U.S. Pat. No. 7,826,377, entitled "Memory Access Optimization and Communications Statistics Computation".

Each packet, along with the attached timestamp and the tag indicating if the packet was received out of sequence, may be communicated from the timestamper 228 to the capture unit 240 directly or via the out-of-sequence engine 235. In either case, the tag indicating if the packet was received out of sequence, may be communicated from the out-of-sequence engine 235 to the capture unit 240. The capture unit 240, which will be described in detail subsequently, may capture and store packets that meet predetermined capture criteria. The captured packets may then be examined and, for example, analyzed to diagnose network or equipment performance problems or failures.

The controller 280 may provide the statistics unit 230, the capture unit 240, and the out-of-sequence engine 235 with instructions and data necessary for those units to perform the described functions. For example, the controller 280 may receive requests for flow statistics from a user via a user interface (not shown) which may be a portion of, or external to, the controller 280. The controller 280 may relay the request for flow statistics to the statistics unit 230, and receive the requested flow statistics information from the statistics unit 230. The controller 280 may present the requested flow statistics to the user via the user interface.

For further example, the controller 280 may receive one or more capture criteria from the user via the user interface. The controller 280 may relay the capture criteria to the capture unit 240. The controller 280 may also, in response to user requests, retrieve, display, and/or analyze packets captured by the capture unit 240.

Figure 3:
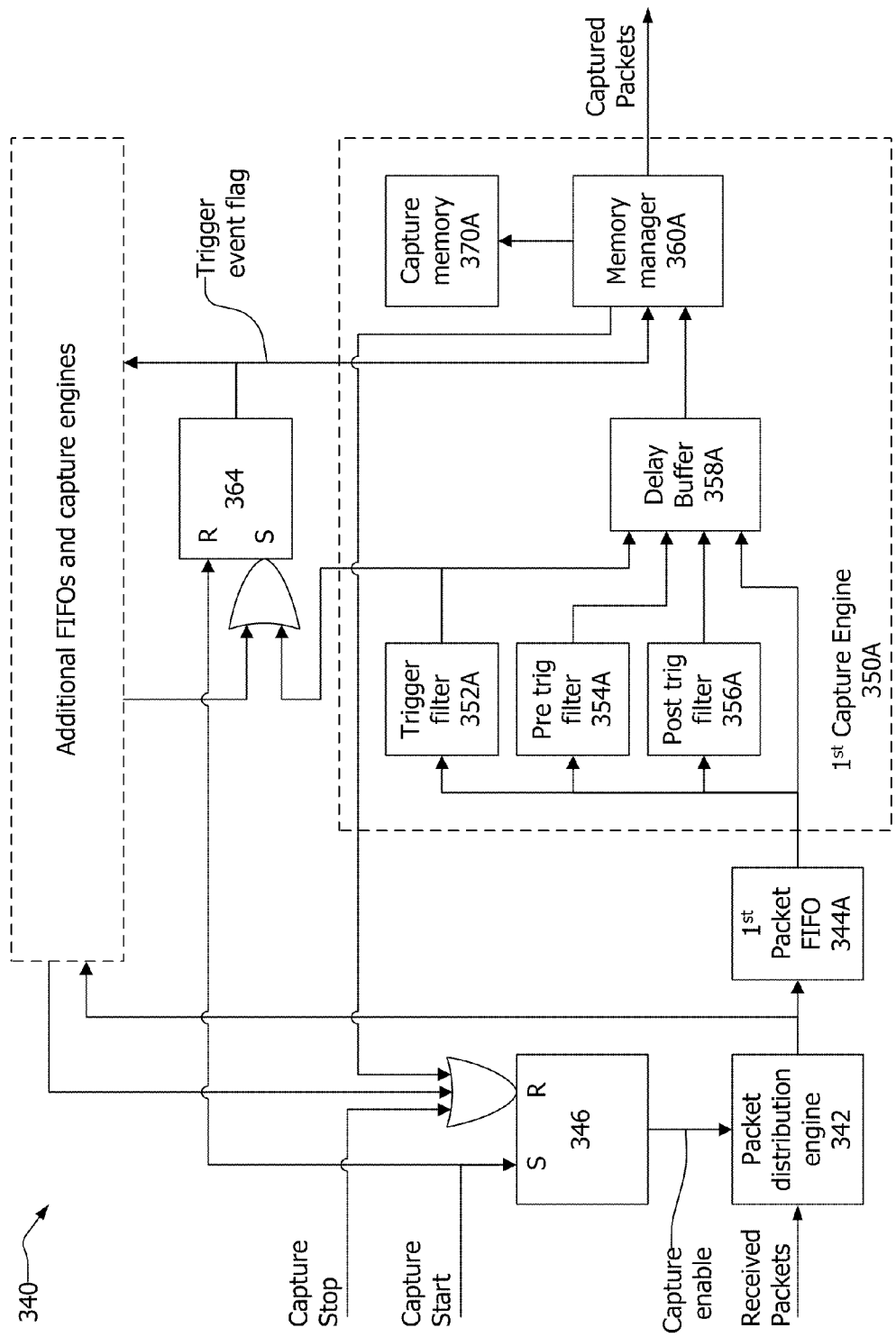
FIG. 3 is a block diagram of an exemplary capture unit.

Referring now to FIG. 3, a capture unit 340, which may be suitable for use as the capture unit 240, may include a packet distribution engine 342, a plurality of packet FIFOs including a first packet FIFO 344A, and a plurality of capture engines including a first capture engine 350A.

The capture unit 340 may also include a first flip-flop 346 or other storage register that provides a capture enable signal or flag indicating when a capture process is in progress. The capture enable flag may be, for example, a binary signal that is "true" when capture is enabled and "false" when capture is not enabled. The first flip-flop 346 may be set, causing the capture enable flag to become true, by a capture start signal. The capture start signal may be received, for example, from a controller (not shown in FIG. 3) such as the controller 280. The first flip-flop may be reset, causing the capture enable flag to become false, by a capture stop signal from the controller or by a signal from any of the plurality of capture engines indicating that the capture process is complete. For example, the capture process may be considered complete when a predetermined number of packets have been captured by one or more capture engines.

The packet distribution engine 342 may be an engine that accepts timestamped received packets and distributes the received packets to the plurality of packet FIFOs associated with the plurality of capture engines. Prior to distributing each packet, the packet distribution engine may attach a flag indicating if the packet was or was not received when the capture enable flag was true. The overall data rate of the received packets may be equal to, or nearly equal to, a line rate of a network or equipment under test. The received packets may be distributed to and stored in the plurality of packet FIFOs at the line rate. The received packets may be retrieved from the plurality of packet FIFOs and processed by the plurality of capture engines at a data rate equal to the line rate divided by N, where N is an integer equal to the number of parallel packet FIFOs and capture engines.

The packet distribution engine 342 may distribute the received packets in round-robin fashion, such that each of N capture engines receives every N'th packet. The packet distribution engine may distribute the received packets such that each received packet is routed to the packet FIFO having the most available capacity. In this manner, the total length of the received packets may be more uniformly distributed between the plurality of capture engines.

The first capture engine 350A may include a plurality of filters including at least a trigger filter. Each of the plurality of filters may be associated with one of a corresponding plurality of capture criteria that define which packets should be captured. All of the plurality of capture engines may use the same plurality of capture criteria. These filters may determine if a packet routed to the first capture engine 350A matches one or more of a trigger criteria and at least one other capture criteria. The capture criteria may be loaded into the corresponding filters, for example from a controller such as the controller 280, at the start of the capture process.

Each of the capture criteria may include one or more conditions that a packet must match to be captured. For example, each of the capture criteria may include a specific value or range of values for one or more fields within the packet, such as one or more of a MAC destination address field, a MAC source address field, an IP destination address field, an IP source address field, and other fields. Each of the capture criteria may include other requirements such as, for example, a packet was/was not received in sequence and/or that a packet does/does not contain a checksum or cyclic redundancy check (CRC) error. Each of the capture criteria may include other conditions and combinations of multiple conditions.

The trigger criteria may identify a packet or sequence of packets of singular interest. For example, the trigger criteria may identify a particular type of erroneous packet for use in network failure analysis. During a capture operation, a received packet that matches the trigger criteria may be identified as a "trigger event". Commonly, the first received packet that that matches the trigger criteria may be the "trigger event", but the trigger event may be defined to be the second, fifth, hundredth, or some other occurrence of a packet that matches the trigger criteria.

The trigger criteria may identify a combination or sequence of packets. For example, the trigger criteria may include a final trigger criteria and one or more pre-trigger criteria. In this case, the trigger event may be defined as a packet (first or other occurrence) that meets the final trigger criteria and was received after at least one packet meeting one of the pre-trigger criteria. For further example, the trigger event may defined as a packet (first or other occurrence) that meets the final trigger criteria and was received after each of the pre-trigger criteria have been met, possibly in a specified order, by at least one packet.

In the case where the trigger criteria identifies a sequence of packets, the trigger filter may include a final trigger filter, a plurality of pre-trigger filters, and a state engine to manage the sequence in which received packets meet the pre-trigger and final filter criteria in order to cause a trigger event.

The capture unit 340 may include a second flip-flop 364 or other storage register that provides a trigger event flag or signal indicating that a trigger event has occurred. The second flip-flop 364 may be reset, causing the trigger event flag to become false, by the capture start signal. The second flip-flop may subsequently be set, causing the trigger event flag to become true, by a signal from any of the plurality of capture engines indicating that a trigger event has occurred.

In the example of FIG. 3, the first capture engine 350A may include a trigger filter 352A, a pre-trigger filter 354A and a post-trigger filter 356A which determine if a packet matches corresponding trigger criteria, pre-trigger criteria, and post-trigger criteria. The pre-trigger criteria may identify packets to be captured prior to the trigger event. Similarly, the post-trigger criteria may identify packets to be captured after the trigger event. Within the first capture engine 350A, each of the trigger filter 352A, the pre-trigger filter 354A, and the post-trigger filter 356A may attach a corresponding flag or data bit to each packet to indicate if the packet matches the corresponding criteria.

The first capture engine 350A may also include a capture memory 370A to store packets to be captured, a memory manager 360A to control writing packets to and reading packets from the capture memory 370A, and a delay buffer 358A to delay the packets and the attached flags by a predetermined time period. The function of the delay buffer can be understood by inspection of FIG. 4.

Figure 4:
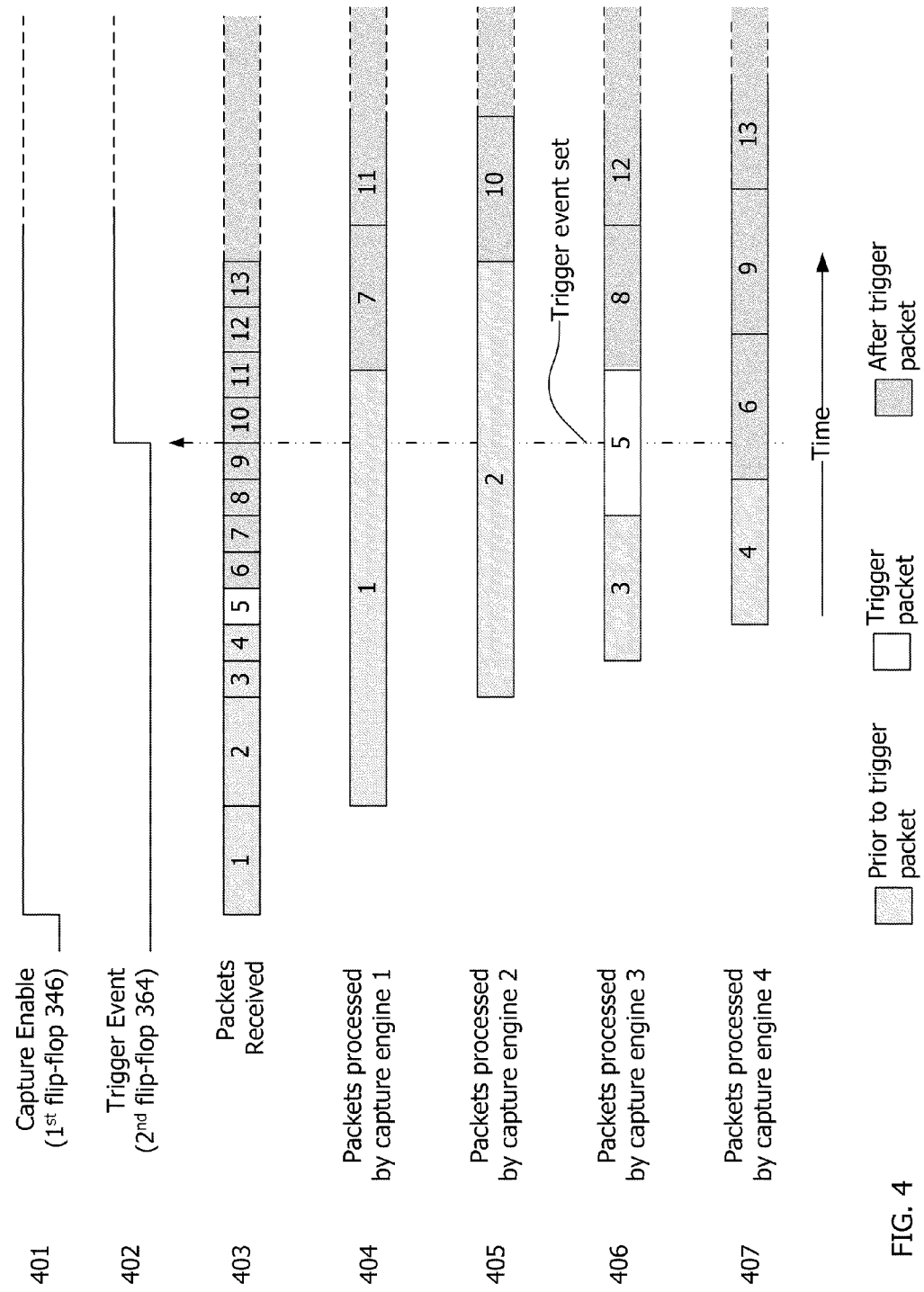
FIG. 4 is a timing diagram illustrating the operation of an exemplary capture unit.

FIG. 4 is an exemplary timing diagram showing the processing of received packets by the plurality of capture engines. The first two lines 401, 402 of the timing diagram show the capture enable flag from the first flip-flop 346 and the trigger event flag from the second flip-flop 364, respectively. The third line 403 is a graphic illustration of a series of received packets. The received packets are sequentially numbered for ease of reference, and are shaded to indicate the relative position of each packet with respect to a trigger event. More specifically, the third line 403 depicts the timing of loading the received packets into one or a plurality of FIFO queues, such as the packet FIFO 344A.

The fourth through seventh lines 404, 405, 406, 407 depict the processing of the received packets by four capture engines, each of which may be the same as the capture engine 350A. Four capture engines are used as an example, and the number of capture engines in a traffic receiver may be fewer or greater than four. Received packets may be distributed between the four capture engines in round-robin fashion, such that each of four capture engines receives every fourth packet. Received packet destined for each of the four capture engines may be held in FIFO queues associated with each capture engine. Received packets may be distributed between the four capture engines such that each new received packet is routed to the FIFO queue having the most available capacity. In this manner, the total length of the received packets may be more uniformly distributed between the four capture engines.

Received packets may be loaded into the FIFO queues at the line rate. Since the four packet engines process received packet concurrently, the data rate within each capture engine may be only one-fourth of the line rate. Thus each of the four packet engines may retrieve packets from its associated FIFO queue at one-fourth of the line rate. The fourth through seventh lines 404, 405, 406, 407 depict the timing of the capture engine retrieving received packets from the FIFO queues. Note that, since the data rate in the capture engines is one-fourth (in this example) of the line rate, the time interval required to retrieve each packet from a FIFO queue is four times as long as the time interval required to load each packet into the FIFO queue, as shown on line 403.

In the example of FIG. 4, the fifth received packet is assumed to be a trigger packet or the first received packet that matches a set of trigger criteria. Thus, at some point during the processing of the fifth packet by the third capture engine (line 406), the trigger event flag (line 402) will be set. In this example, at the instant that the trigger event flag is set, the first and second capture engines (lines 404 and 405) are processing packets one and two, which were received prior to the trigger packet, and the fourth capture engine is processing packet six, which was received after the trigger packet. However, the first, second, and fourth capture engines may not have visibility of the relative arrival times of the packets being processed and the trigger packet. Thus the first, second, and fourth capture engines may not know which of the pre-trigger and post-trigger filters to apply at the time the trigger event flag is set. Thus the first, second, and fourth capture engines may fail to capture all of the desired packets.

Referring back to FIG. 3, to ensure that all desired packets are captured, the first capture engine may include a delay buffer 358A which delays the received packets and the associated trigger flags attached by filters 352A, 354A, 356A for a predetermined time period. The predetermined time period may be equal to or longer than the time period required for a capture engine to process the longest anticipated packet. The delay buffer 358A may be, for example, a FIFO queue which continuously stores and reads packet and flag data. Such a FIFO queue may be implemented, for further example, by a random access memory with read and write pointers that continuously cycle through the possible memory addresses.

The memory manager 360A may extract packet and flag data from the delay buffer 358A and control writing the packets to be captured to the capture memory 370A. The memory manager 360A may be an engine, such as for example a state machine, implemented in hardware that repetitively performs the operations required to store the packets to be captured into the capture memory 370A. The memory manager 360A may also perform processes, which will be discussed subsequently, to organize and read the captured packets from the capture memory 370A after a capture operation is complete.

The presence of the delay buffer 358A essentially endows the memory manager with hindsight. At the instant the trigger event flag 364 is set, the memory manager may be determining whether or not to store a packet that was received earlier, by a time period equal to the delay time of the delay buffer 358A, than the trigger packet. To ensure that all of the desired packets are captured, the memory manager 360A may follow three rules to determine if a packet received from the delay buffer 358A is or is not stored:

If the trigger event flag 364 is not set, store each packet only if the attached pre-trigger flag is true (packets meeting the pre-trigger criteria);

For a period of time, which may be equal to the delay time of the delay buffer 358A, after the trigger event flag 364 is set, store each packet if any one or more of the attached pre-trigger flag, trigger flag, and post-trigger flag is true (packets meeting any one or more of the three trigger criteria)

Subsequently, until the capture operation is complete, store each packet only if the attached post-trigger flag is true (packets meeting the post-trigger criteria).

The capture memory 370A may be static random access memory (SRAM), a dynamic random access memory (DRAM), a synchronous dynamic random access memory (SDRAM), a content addressable memory (CAM), or some other memory. One or more capture engines, such as the capture engine 350A, may be implemented, for example, wholly or partially in a programmable circuit device or other semiconductor device. In this event, the capture memory 370A may be external to the programmable circuit device or other semiconductor device containing the capture engine 350A.

Figure 5:
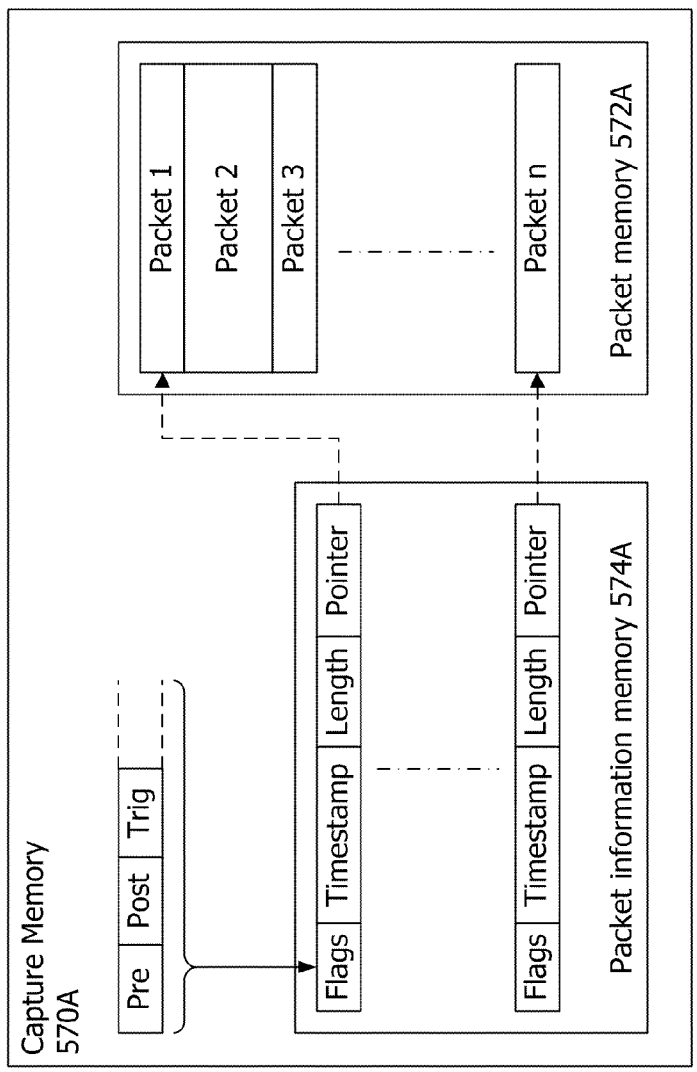
FIG. 5 is a graphical representation of a memory space within a capture engine.

As shown in FIG. 5, a capture memory 570A, which may be the capture memory 370A, may be divided into a packet memory 572A which stores packets and a packet information memory 574A which stores information relating to the packets. Each record stored in the packet information memory 574A may be associated with a packet stored in the packet memory 572A. Each record stored in the packet information memory 574A may include information such as flags attached to the associated packet, the timestamp of the associated packet, the length of the associated packet, and a pointer to the start of the associated packet in the packet memory 572A. Each record stored in the packet information memory 574A may include at least the pre-trigger, trigger, and post-trigger flags attached to each packet by the capture engine. The inclusion of a pointer to the start of the associated packet may allow packets of different lengths to be closely packed in the packet memory 572A, as opposed to storing each packet in a fixed-length segment of the packet memory 572A.

Description of Processes

Figure 6:
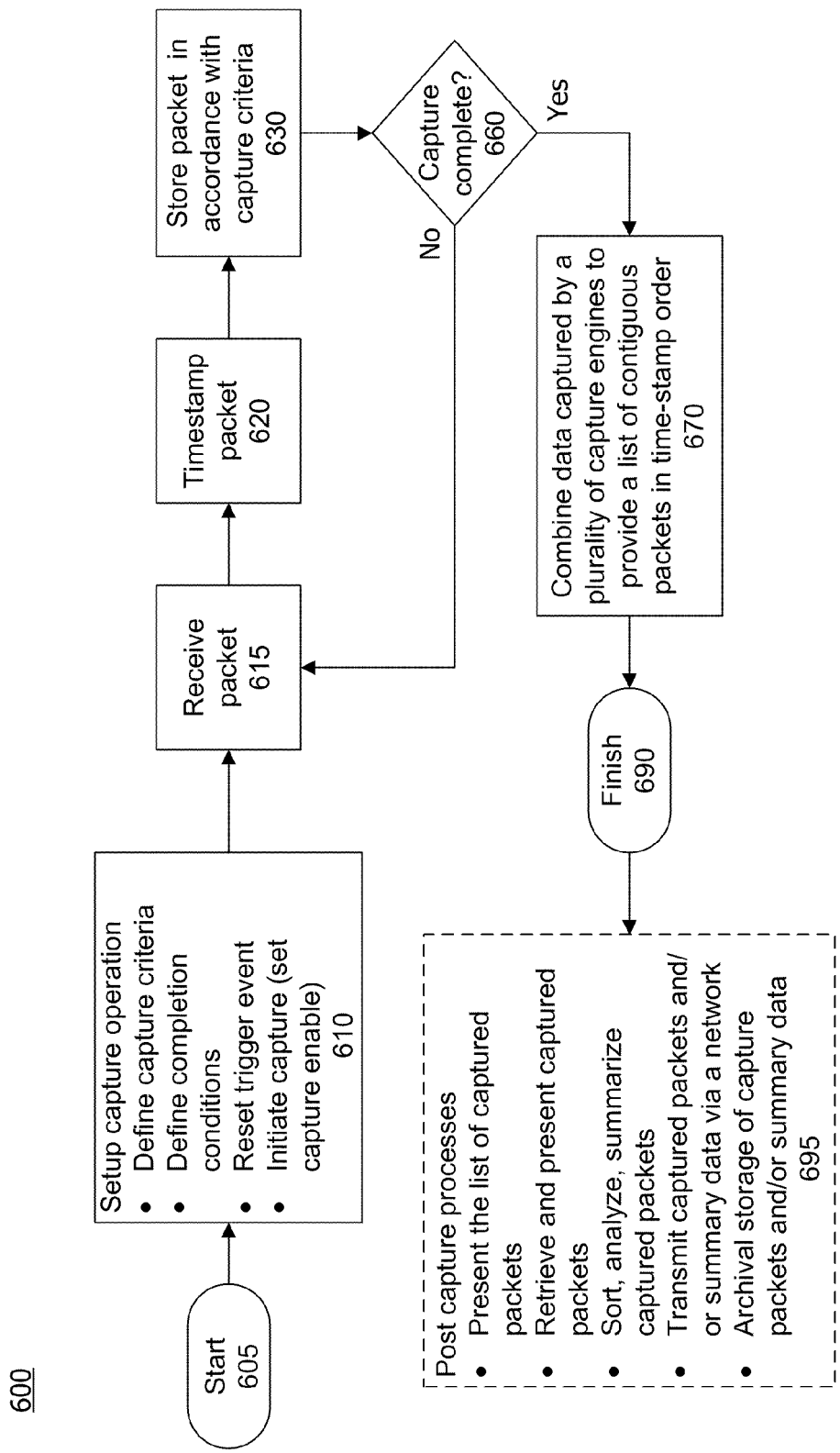
FIG. 6 is a flow chart of a capture operation.

Referring now to FIG. 6, a capture operation 600 is shown having a start 605 and a finish 690. In this context, the term "operation" means a process that includes several portions or phases, each of which may be considered as a partially independent process. The capture operation may be provided by a capture unit, which may be the capture unit 240, under direction of a controller, which may be the controller 280. The capture operation 600 may include a setup portion at 610, a cyclic capture portion 615-660 which may be repeated numerous times, and a concluding portion at 670. After the finish of the capture operation at 690, a variety of post-capture processes 695 may be performed on the packets captured during the capture operation 600.

At 610, the setup portion may include providing one or more capture criteria to the capture unit. The capture criteria may be provided by the controller. The capture criteria may include, for example, a trigger criteria that identifies a trigger event, a pre-trigger criteria that identifies the packets to be captured prior to the trigger event, and a post-trigger criteria that identifies the packets to be captured after the trigger event. Other numbers and types of capture criteria may be provided for use by the capture unit. For further example, the capture criteria may additionally include a second trigger criteria that identifies a second trigger event, and an inter-trigger criteria that identifies packets to be captured between the initial trigger event and the second trigger event.

Each of the capture criteria may include one or more conditions that a packet must match to be captured. For example, each of the capture criteria may include a specific value or range of values for one or more fields within the packet, such as one or more of a MAC destination address field, a MAC source address field, an IP destination address field, an IP source address field, and other fields. Each of the capture criteria may include other requirements such as, for example, a packet was/was not received in sequence and/or that a packet does/does not contain a checksum or CRC error. Each of the capture criteria may include other conditions and combinations of multiple conditions.

At 610, the conditions for completion of the capture operation may also be defined. The conditions for completion of the capture operation may include, for example, one or more of a maximum number of packets to be captured, a specific number or maximum of packets to be captured after a trigger event, a maximum number of bytes to be captured after a trigger event, a maximum time period for the capture operation, a completion criteria that identifies a packet that must be received to complete the capture operation, a real time user command to stop the capture operation, and other conditions. The conditions for completion of the capture operation may be provided to the capture unit by the controller.

At 610, the controller may also reset a trigger event flag within the capture unit. After the capture criteria and the completion conditions have been provided, the controller may set a capture enable flag within the capture unit to initiate the cyclic capture portion of the capture operation 600.

Upon initiation of the cyclic capture portion of the capture operation 600, a first packet may be received at 615 and a timestamp may be attached or added to the first received packet at 620. At 630, the first received packet may, or may not, be stored in accordance with the capture criteria provided to the capture unit at 610. At 630, each packet may be stored if it matches one or more capture criteria that are in effect at the time the packet is processed at 630. For example, the first packet, which is presumably received prior to a trigger event, may be stored if a pre-trigger criteria was provided at 610 and if the first packet matches the pre-trigger criteria.

At 660, a determination may be made if the conditions provided at 610 for completion of the capture operation 600 have been satisfied. In the conditions have been satisfied, the capture operation may continue at 670. If the conditions for completion of the capture event have not been satisfied, the capture operation may return to 615 to receive another packet. The actions from 615 to 660 may repeat cyclically until a determination is made at 660 that the conditions for completion of the capture operation 600 have been satisfied.

At 670, a list of contiguously captured packets in timestamp order may be prepared for subsequent analysis and retrieval of captured packets. When a capture unit, such as the capture unit 340, includes multiple capture engines, the list of captured packets may integrate the packets captured by each of the plurality of capture engines. In some circumstances, which will be described in further detail, one or more capture engines may not retain all of the packets that were stored during the capture operation. In these circumstances, to avoid analysis errors that may be caused by missing packets, the list of packets may be reduced to only those packets that were captured contiguously. The list of captured packets may be prepared within the capture unit and may be provided to, or made available to, the controller.

After the capture operation 600 is finished at 690, one or more post-capture operations 695 may be performed. The post capture operations 695 may include presenting the list of packets to a user, where "presenting" includes displaying, printing, and otherwise making the list accessible to the user. The list may be presented to the user at a user interface associated with a traffic receiver that performed the capture operation 600, or the list may be transmitted via a network to be presented on another device which may be at a remote location. In response to user requests, one or some or all of the captured packets may be retrieved and presented to the user. One or some or all of the captured packets may be transmitted via the network to another device, and one or some or all of the captured packets may be stored on an archival storage device. Additionally, various analyses may be performed on the captured packets, including sorting, categorizing, counting, averaging, and other analysis processes to create data that summarizes the results of the capture operation. These analyses may be performed within the traffic receiver that performed the capture operation 600 or may be performed by another device.

Figure 7:
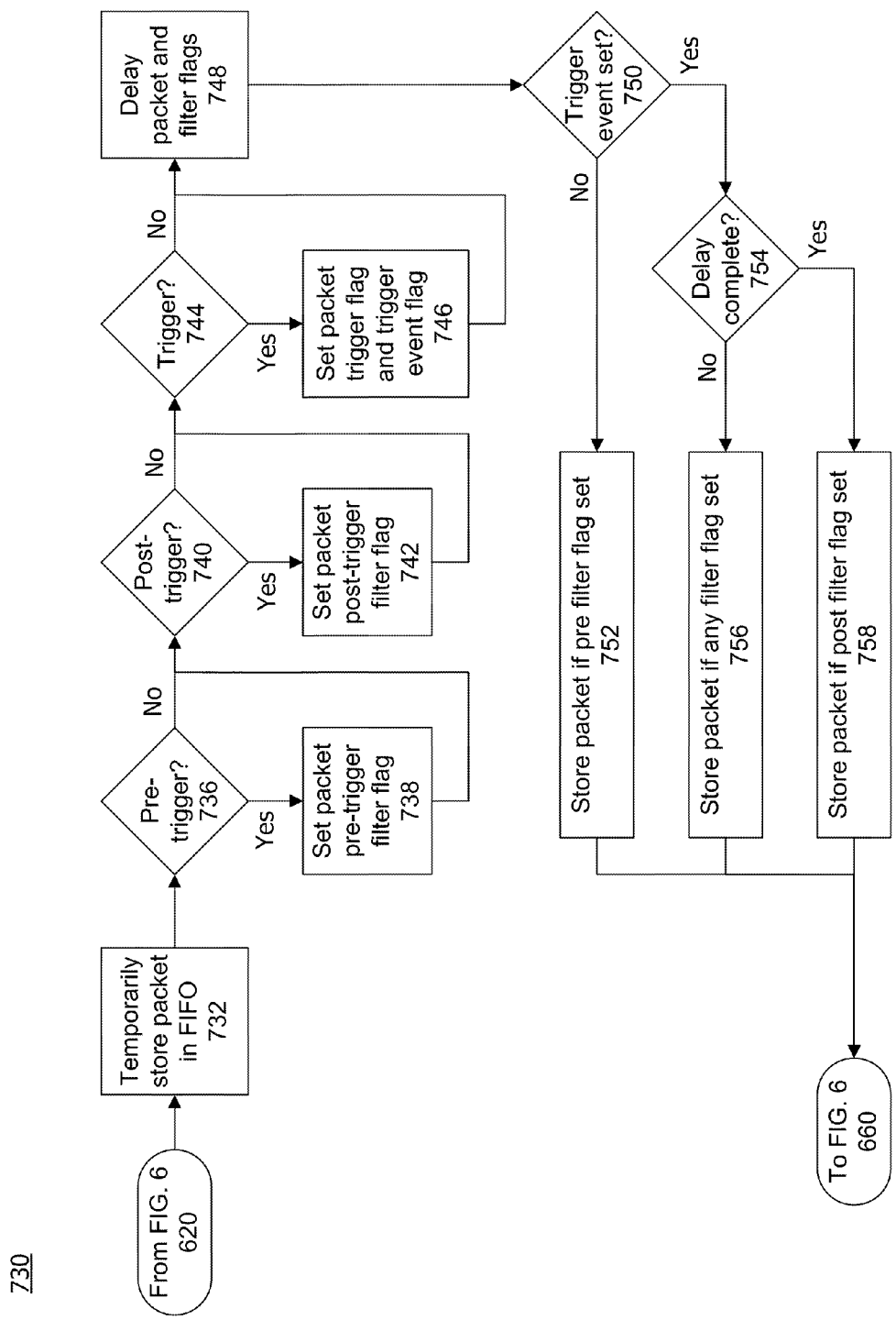
FIG. 7 is a flow chart of a process for operating a capture engine.

FIG. 7 shows details of a process for storing packets 730, which may be suitable for use at 630 in the capture operation 600. At 732, received packets may be temporarily stored in a FIFO queue. At 736, a packet at the top of the FIFO queue may be read from the FIFO queue and compared to a predetermined pre-trigger criteria. If the packet matches the pre-trigger criteria, a pre-trigger filter flag attached to, or associated with, the packet may be set at 738. Similarly, at 740, the packet may be compared to a predetermined post-trigger criteria. If the packet matches the post-trigger criteria, a post-trigger filter flag attached to, or associated with, the packet may be set at 742.

At 744, the packet may be compared to a predetermined trigger criteria. If the packet matches the trigger criteria, a trigger filter flag attached to, or associated with, the packet may be set at 746. Additionally, at 746, a trigger event flag, such as the trigger event flip-flop 364, within the capture unit may be set. Since the trigger event flag may be reset, for example at 610, prior to the start of a capture operation, the first packet that matches the trigger criteria will set the trigger event flag at 746.

For convenience of illustration, FIG. 7 shows the comparisons between the packets and the various criteria at 736, 740, and 744 performed sequentially. The comparisons at 736, 740, and 744 may be performed sequentially in any order, may be performed concurrently, or may be performed partially concurrently and partially sequentially in any combination.

At 748, the packet and the attached/associated filter flags may be delayed for a predetermined delay period. The predetermined delay period may be defined, for example, as a predetermined number of cycles of a clock. The packet may be delayed, for further example, in a FIFO queue or other buffer memory where the number of storage slots is equal to the predetermined number of clock cycles, such that a storage slot is read and written on each clock cycle. The packet and the attached/associated filter flags may be delayed in some other manner.

At 750, after the packet and flags have been delayed for the predetermined period, a determination may be made if the trigger event flag is set. If the trigger event flag is not set (indicating that a packet matching the trigger criteria has not yet been received), the packet may be stored at 752 only if the pre-trigger filter flag attached to the packet is set.

If, at 750, a determination is made that the trigger event flag is set, a determination may be made at 754 if the predetermined delay period has elapsed since the trigger event flag was set. If the predetermined delay period has not elapsed since the trigger event flag was set, the packet may be stored at 756 if any one or more of the pre-trigger, post-trigger, and trigger filter flags are set. If a determination is made at 754 that the predetermined delay period has elapsed since the trigger event flag was set, the packet may be stored at 758 only if the post-trigger filter flag is set.

FIG. 8A is a timing diagram illustrating the operation of a capture engine, such as the capture engine 350A, storing packets in a packet memory, such as the packet memory 572A. FIG. 8B is a graphical representation of packets stored in the packet memory.

In FIG. 8A, a packet capture operation defined by a capture enable flag 810. During the packet capture operation, a series of packets 820 are received. The received packets are numbered 1, 2, 3 . . . n+4 in sequence for ease of explanation. Of the received packets, the shaded packets 1, 5, 9, . . . n+1 are presumed to be processed by a first capture engine of a plurality of capture engines. The remaining packets are presumed to be processed by other capture engines of the plurality of capture engines.

In FIG. 8B, lines 850 and 860 represent packets stored in a first capture memory, in which packets captured by the first capture engine are stored. Line 850 shows the content of the first packet memory before the packet n+1 is stored. At this time, packets 1, 5, and 9 are stored at the low-address end of the first packet memory. In this example, at the time that packet n+1 is stored in the first packet memory, the remaining capacity of the first packet memory is not sufficient to store the entire packet n+1. Thus, as shown on line 860, a portion of packet n+1 is stored at the high-address end of the first packet memory and the remainder of packet n+1 is stored at the low-address end, overwriting previously stored packet 1 and packet 5. This condition may be referred to as a memory "wrap" since packet n+1 figuratively wraps from the one end of the memory to the other end, as indicated by the dashed line 861.

In the example of FIG. 8A and FIG. 8B, the capture operation ends without any additional packets being stored in the first capture memory. The example of FIG. 8A and FIG. 8B also assumes that only the first capture engine wraps during the capture operation. At the end of the capture operation, as shown on line 830, the packets actually stored in the memories of the plurality of capture engines are packets 2, 3, 4, and 6 to n+4. In this example, packets 1 and 5 are missing since these packets were overwritten by a portion of packet n+1. Note that the packets actually stored are not contiguous, since packet 5 is missing between packets 4 and 6.

In an actual capture operation, more than one packet memory may wrap. In some circumstances, such as when a large number of pre-trigger packets are stored prior to a rarely-occurring trigger event, one or more packet memory may wrap more than one time. Additionally, when the memory associated with a capture engine is organized into a packet memory and a packet information memory, as shown in FIG. 5, either or both of the packet memory and the packet information memory may wrap.

Figure 9:
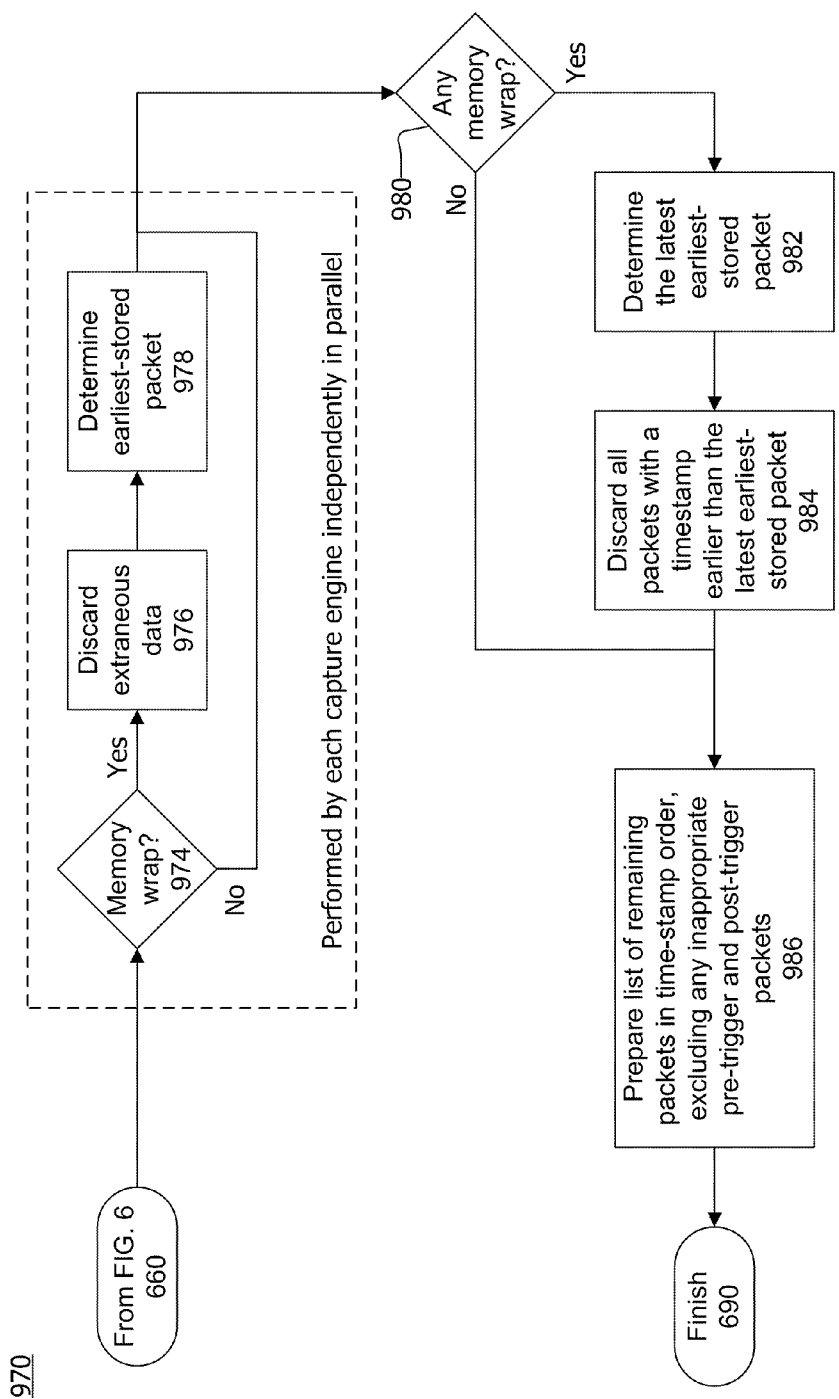
FIG. 9 is a flow chart of a process for combining data captured by a plurality of capture engines.

FIG. 9 shows a flow chart of a process 970 for integrating information captured by a plurality of capture engines to provide a list of contiguously captured packets in timestamp order. The process 970 may be suitable for use at 670 in the process 600. In the process 970, the actions 974 to 967 are performed by each of a plurality of capture engines independently in parallel, and the actions 980-986 are performed by the plurality of capture engines collectively. For example the actions 980-986 may be performed primarily by a single one of the capture engines using information provided by the others of the plurality of capture engines.

At 974, each capture engine may determine if the associated memory wrapped during a capture operation. When the associated memory is divided into a packet memory and a packet information memory, a determination may be made if either or both of the packet memory and the packet information memory wrapped during the capture operation. If a memory wrap did not occur, no further independent action is required.

When a determination is made that a memory wrap did occur during the capture operation, extraneous data may be discarded at 976. More specifically, each capture engine may discard all stored packets associated with packet information records that were over-written during the capture operation. Additionally, each capture engine may discard all packet information records associated with packets that were over-written during the capture operation. A packet or a packet information record that is "discarded" may not be erased but may be omitted from a list of contiguously captured packets that is subsequently prepared.

At 978, after any extraneous data has been discarded, each capture engine may identify an "earliest-stored" packet, which may be the packet (among the packets that were not discarded) having the earliest timestamp. In the example of FIG. 8A and FIG. 8B, the earliest-stored packet for the first capture engine is packet 9.

At 980, a determination may be made if one or more of the plurality of capture engines experienced a memory wrap during the capture operation. If a determination is made at 980 that no memory wraps occurred during the capture operation, the process 970 may proceed to 986, which will be described subsequently.

If a determination is made at 980 that at least one memory wrap occurred among the plurality of capture engines, the latest of the "earliest-stored" packet may be identified at 982. More specifically, at 982, the "latest earliest-stored" packet is the packet having the latest timestamp among the earliest-stored packets identified (at 978) by the capture engines where a memory wrap occurred.

In the example of FIG. 8A and FIG. 8B, packet 9 is the latest earliest-stored packet since only one capture engine had a memory wrap during the capture operation. Since no packets received after packet 9 were over-written, all of the packets from packet 9 to the termination of the capture operation are guaranteed to be contiguous. In the example of FIG. 8A and FIG. 8B, packets 6, 7, and 8 are also contiguous with packet 9. However, during a complex capture operation with multiple capture engines and multiple memory wraps, it may not be possible to identify which packets, if any, prior to the "latest earliest-stored" packet are contiguous. Thus the preparation of a list of contiguously captured packets (a list identifying a contiguous string of captured packets without any missing packets) must inherently include discarding all packets, if any, having timestamps earlier than the timestamp of the "latest earliest-stored" packet. At 984, each of the capture engines may discard all packets having timestamps earlier that the timestamp of "latest earliest-stored" packet identified at 982.

At 986, a list of contiguously captured packets in timestamp order may be prepared. At 986, the remaining, undiscarded, stored packets are known to be contiguous. However, the remaining stored packets may not all be appropriate. Specifically, the remaining stored packets may include one or more packets that matched only a post-trigger criteria but have timestamps earlier than the timestamp of the trigger event packet (the first packet that matched a trigger criteria). Similarly, the remaining stored packets may include one or more packets that matched only a pre-trigger criteria but have timestamps later than the timestamp of the trigger event packet. These inappropriate packets may be excluded from the list of captured packets prepared at 986.

The list of captured packets may be prepared at 986 by the plurality of capture engines collectively, or by one of the capture engines using information provided by the other capture engines. The list of captured packets may be prepared at 986 by a controller, such as the controller 280, external to the capture engines using information provided by the plurality of capture engines.

Figure 10:
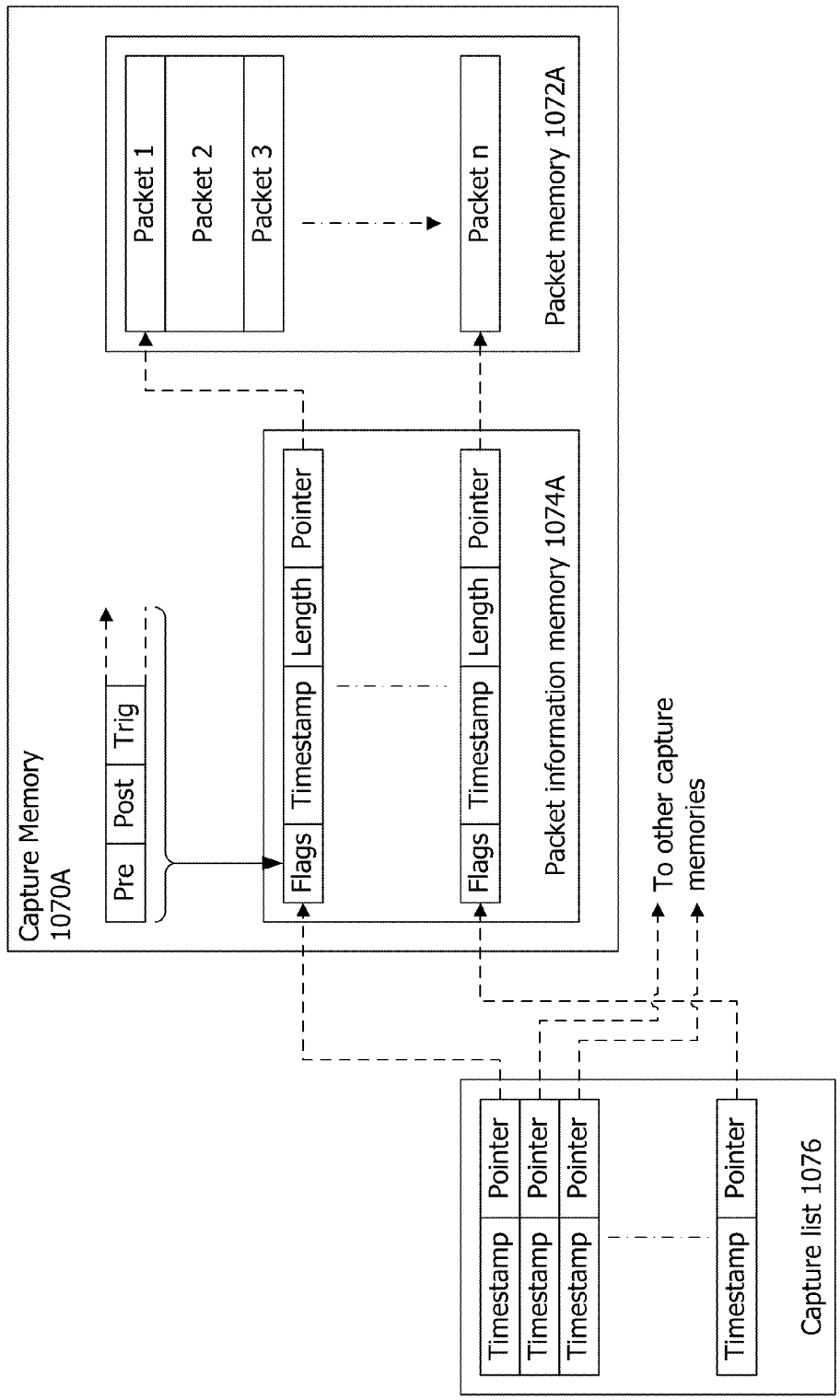
FIG. 10 is a graphical representation of a capture list.

FIG. 10 shows a graphical representation of an exemplary capture list 1076 that may be prepared at 986. The capture list 1076 may include, for each capture packet, the timestamp of the packet and a pointer to the corresponding packet information record in a packet information memory 1074A. The packet information record may, in turn, include a pointer to the packet stored in a packet memory 1072A. The packet information memory 1074A and the packet memory 1072A may be portions of a capture memory 1070A associated with one of a plurality of capture engines. The capture list 1076 may be stored in a portion of one of the capture memories, such as the capture memory 1070A. The capture list may be divided among a plurality of capture memories. The capture list may be stored in a memory, such as a memory associated with the controller 280, independent of the plurality of capture memories.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method of capturing packets, comprising:
   receiving packets from a network
   attaching a timestamp to each received packet
   distributing the received packets among a plurality of capture engines, each capture engine associated with a respective one of a plurality of capture memories
   capturing at least some of the received packets, wherein each capture engine of the plurality of capture engine performs actions including:
     determining if each received packet distributed to the capture engine matches one or more of a plurality of predetermined capture criteria
     storing, in the associated capture memory, at least some of the received packets distributed to the capture engine that match one or more of the plurality of capture criteria
   discontinuing capturing received packets in accordance with a predetermined completion criteria
   after discontinuing capturing received packets, eliminating non-contiguous packets from the packets stored by the plurality of capture engines in the plurality of capture memories and preparing a list in timestamp order of contiguous packets stored by the plurality of capture engines.

2. The method of claim 1, wherein
   the plurality of predetermined capture criteria includes a trigger criteria, a pre-trigger criteria, and post-trigger criteria
   wherein a first time any one of the plurality of capture engines determines that a received packet matches the trigger criteria is considered a trigger event and the received packet that causes the trigger event is considered a trigger packet.

3. The method of claim 2, wherein storing at least some of the received packets further comprises:
   when the trigger event has not yet occurred, storing only received packets that match the pre-trigger criteria
   when the trigger event has occurred
     storing each received packet that matches one or more of the pre-trigger criteria, the trigger criteria, and the post-trigger criteria during a predetermined delay time after the trigger event
     after the predetermined delay time has elapsed, storing only received packets that match the post-trigger criteria.

4. The method of claim 3, wherein storing at least some of the received packets further comprises:
   storing received packets in a first portion of each of the plurality of capture memories
   storing packet information related to the stored packet in a second portion of each of the plurality of capture memories
   wherein, for each stored packet, the packet information includes the timestamp attached to the packet, a pointer to a location where the packet is stored, and flags indicating if the packet matches one or more of the pre-trigger criteria, the trigger criteria, and the post-trigger criteria.

5. The method of claim 4, where the list in timestamp order of contiguous packets comprises:
   a table in a memory including, for each listed packet, the packet timestamp and a pointer to the associated packet information.

6. The method of claim 3, wherein preparing a list in timestamp order of contiguous packets includes:
   discarding each stored packet that meets only the pre-trigger criteria and has a timestamp value greater than the timestamp value of the trigger packet
   discarding each stored packet that meets only the post-trigger criteria and has a timestamp value less than the timestamp value of the trigger packet.

7. The method of claim 1, further comprising:
   temporarily holding each timestamped received packet in a FIFO queue of a plurality of FIFO queues each coupled to a corresponding one of the plurality of capture engines.

8. The method of claim 7, wherein each received packet is held in one FIFO queue of the plurality of FIFO queues for a period equal to the predetermined delay time.

9. A traffic receiver, comprising:
   a plurality of capture engines to capture packets, each capture engine associated with a respective one of a plurality of capture memories
   a network interface unit to receive packets from a network
   a timestamper configured to attach a timestamp to each received packet
   a packet distribution engine configured to distribute the timestamped received packets among the plurality of capture engines
   wherein each of the plurality of capture engines is configured to capture packets by performing actions including
     determining if each received packet distributed to the capture engine matches one or more of a plurality of predetermined capture criteria
     storing, in the respective capture memory, at least some of the received packets that match one or more of the plurality of capture criteria.

10. The traffic receiver of claim 9, wherein
the plurality of predetermined capture criteria includes a trigger criteria, a pre-trigger criteria, and post-trigger criteria
wherein a first time any one of the plurality of capture engines determines that a received packet matches the trigger criteria is considered a trigger event.

11. The traffic receiver of claim 10, wherein storing at least some of the received packets further comprises:
when the trigger event has not yet occurred, storing only received packets that match the pre-trigger criteria
when the trigger event has occurred
storing each received packet that matches one or more of the pre-trigger criteria, the trigger criteria, and the post-trigger criteria during a predetermined delay time after the trigger event
after the predetermined delay time has elapsed, storing only received packets that match the post-trigger criteria.

12. The traffic receiver of claim 11, wherein the actions performed by each capture engine further include:
storing each packet to be captured in a first portion of the respective capture memory
storing packet information related to each stored packet in a second portion of the respective capture memory
wherein the packet information related to each stored packet includes the timestamp attached to the packet, a pointer to a location where the packet is stored, and flags indicating if the packet matches one or more of the pre-trigger criteria, the trigger criteria, and the post-trigger criteria.

13. The traffic receiver of claim 12, wherein the plurality of capture engines are configured to collectively perform further actions including:
discontinuing storing received packets in accordance with a predetermined finish criteria
after discontinuing storing received packets, preparing a list of contiguously captured packets in timestamp order.

14. The traffic receiver of claim 13, wherein the list of contiguously captured packets comprises:
a table in a memory, the table including, for each listed packet, the packet timestamp and a pointer to the associated packet information.

15. The traffic receiver of claim 9, further comprising:
a plurality of FIFO queues to temporarily hold timestamped received packets, each of the plurality of FIFO queues coupled to a corresponding one of the plurality of capture engines.

16. The traffic receiver of claim 15, wherein:
each of the plurality of FIFO queues is configured to hold each timestamped received packet for a period equal to the predetermined delay time.

17. A non-transitory machine readable storage medium having programming code stored thereon which, when used to program a programmable circuit device, will cause the programmable circuit device to be configured to include a capture engine, the capture engine performing actions comprising:
receiving a plurality of timestamped received packets
determining if each timestamped received packet matches one or more of a plurality of predetermined capture criteria including a trigger criteria, a pre-trigger criteria, and post-trigger criteria, wherein a first time any one of the plurality of capture engines determines that a timestamped received packet matches the trigger criteria is considered a trigger event
when the trigger event has not yet occurred, storing in an associated capture memory only timestamped received packets that match the pre-trigger criteria
when the trigger event has occurred
storing in the associated capture memory each timestamped received packet that matches one or more of the pre-trigger criteria, the trigger criteria, and the post-trigger criteria during a predetermined delay time after the trigger event
after the predetermined delay time has elapsed, storing in the associated capture memory only timestamped received packets that match the post-trigger criteria.

18. The non-transitory machine readable storage medium of claim 17, the actions performed further including:
storing the timestamped received packets in a first portion of a capture memory
storing packet information related to the timestamped received packets in a second portion of the capture memory
wherein the packet information for each stored timestamped received packet includes the timestamp attached to the packet, a pointer to a location where the packet is stored, and flags indicating if the packet matches one or more of the pre-trigger criteria, the trigger criteria, and the post-trigger criteria.

19. A traffic receiver, comprising:
a plurality of capture engines
a network interface unit to receive packets from a network
a timestamper that attaches a timestamp to each received packet
a packet distribution engine that distributes timestamped received packet among a plurality of capture engines
wherein each of the plurality of capture engines further comprises:
a plurality of filters, each filter associated with a corresponding one of a plurality of predetermined capture criteria, each filter effective to determine if a received packet matches the associated capture criteria
a delay buffer which delays packets that match at least one of the capture criteria for a predetermined delay time
a capture memory
a memory controller coupled to receive delayed packets from the delay buffer, the memory controller effective to store at least some of the delayed packets received from the delay buffer in the capture memory.

20. The traffic receiver of claim 19, wherein
the plurality of predetermined capture criteria includes a trigger criteria, a pre-trigger criteria, and post-trigger criteria, wherein a first time any one of the plurality of capture engines determines that a received packet matches the trigger criteria is considered a trigger event.

21. The traffic receiver of claim 20, wherein the memory controllers within each capture engine are adapted to performs actions including:
when the trigger event has not yet occurred, storing only delayed packets that match the pre-trigger criteria
when the trigger event has occurred
storing each delayed packet that matches one or more of the pre-trigger criteria, the trigger criteria, and the post-trigger criteria during the predetermined delay time after the trigger event
after the predetermined delay time has elapsed, storing only delayed packets that match the post-trigger criteria.

22. The traffic receiver of claim 21, wherein the memory controller within each capture engine is further adapted to:

store each delayed packet to be captured in a first portion of the capture memory store packet information related to each stored packet in a second portion of the capture memory wherein the packet information for each stored packet includes the timestamp attached to the packet, a pointer to a location where the packet is stored in the first portion of the memory, and flags indicating if the packet matches one or more of the pre-trigger criteria, the trigger criteria, and the post-trigger criteria.

23. The traffic receiver of claim 22, wherein the memory controllers within each of the plurality of capture engines are further adapted to collectively:

discontinue storing received packets in accordance with a predetermined finish criteria prepare a list of contiguously captured packets in timestamp order.

24. The traffic receiver of claim 23, wherein the list of the remaining packets in timestamp order comprises:

a table in a memory, the table including, for each listed packet, the packet timestamp and a pointer to the associated packet information.

25. A non-transitory machine readable storage medium having programming code stored thereon which, when used to program a programmable circuit device, will cause the programmable circuit device to be configured to include a capture engine, the capture engine comprising:

a plurality of filters, each filter associated with a corresponding one of a plurality of predetermined capture criteria, each filter effective to determine if a received packet matches the associated capture criteria a delay buffer which delays received packets that match at least one of the capture criteria for a predetermined delay time a memory controller coupled to receive delayed packets from the delay buffer and effective to store at least some of the delayed packets from the delay buffer in a capture memory.

26. The non-transitory machine readable storage medium of claim 25, wherein the plurality of predetermined capture criteria includes a trigger criteria, a pre-trigger criteria, and post-trigger criteria, wherein a first time any one of a plurality of capture engines determines that a received packet matches the trigger criteria is considered a trigger event.

27. The non-transitory machine readable storage medium of claim 26, wherein the memory controller is adapted to performs actions including:

when the trigger event has not yet occurred, storing only delayed packets that match the pre-trigger criteria when the trigger event has occurred storing each delayed packet that matches one or more of the pre-trigger criteria, the trigger criteria, and the post-trigger criteria during a predetermined delay time after the trigger event after the predetermined delay time has elapsed, storing only delayed packets that match the post-trigger criteria.

28. The non-transitory machine readable storage medium of claim 27, wherein the memory controller is further adapted to:

store each delayed packet to be captured in a first portion of the capture memory store packet information related to each stored packet in a second portion of the capture memory wherein the packet information for each stored packet includes a timestamp associated with the packet, a pointer to a location where the packet is stored in the first portion of the capture memory, and flags indicating if the packet matches one or more of the pre-trigger criteria, the trigger criteria, and the post-trigger criteria.

* * * * *